Patented Mar. 12, 1940

2,193,670

UNITED STATES PATENT OFFICE 2,193,670

LUBRICANT FOR MOLDING COMPOSITIONS

Maurice H. Bigelow, Toledo, Ohio, assignor to Plaskon Company, Incorporated, Toledo, Ohio, a corporation of Delaware No Drawing. Application June 24, 1938, Serial No. 215,710

3 Claims. (Cl. 260—33)

The invention relates to novel lubricants for molding compositions, particularly formaldehyde-urea molding compositions.

When a formaldehyde-urea molding composition is formed into a finished article by hot-pressing in the usual manner, a suitable lubricant must be employed to prevent the article from sticking in the mold. If some of the composition adheres to the mold when the molded article is removed, the surface of the article is spoiled and the mold must be cleaned and polished before it can again be used.

It has been suggested that the interior of the mold be "greased" with a lubricant as a precaution against sticking. However, the mere application of a lubricant to the interior of a mold has proved to be insufficient to prevent sticking, because the molding composition in flowing under heat and pressure may wipe a portion of the mold's surface entirely bare of lubricant. Particles or drops of lubricant in the mold also may cause flows in the surface of the finished article. The usual procedure is to incorporate a small amount of lubricant as one of the ingredients in the manufacture of the molding composition.

In order to be suitable for incorporation as one of the ingredients in a molding composition a lubricant must have certain important characteristics. It must be a perfectly non-gummy solid at ordinary temperatures so that it can be ground into a fine, fluffy powder. If a lubricant is even slightly gummy or greasy at ordinary temperatures, it cannot be properly mixed or dispersed into a molding composition. When an attempt is made to incorporate a gummy substance as an ingredient in a powdered molding composition by grinding in a ball mill, the gummy substance remains in small lumps or agglomerations which appear as specks in the surface of a molded article made from the composition.

Although a lubricant must not be gummy or greasy at room temperature, it must melt at the molding temperature to form an oily liquid capable of lubricating the mold. This oily liquid must not dissolve in the plastic composition during the molding, but must bleed out of the material to the mold's surface.

Some materials that might otherwise be satisfactory for incorporation in formaldehyde-urea molding compositions as lubricants have been discarded because they were found to be either too acid or too alkaline. An acid lubricant cannot be used in a formaldehyde-urea molding composition, because it renders the composition unstable, so that it gradually sets to an infusible mass. Alkaline lubricants are not satisfactory because they retard the hardening of the composition in the mold. The speed with which a formaldehyde-urea composition hardens in the mold is a highly important property that must not be impaired. Doubling the length of time required for hot-molding a given composition doubles the number of molds required for the same rate of production, and hot-molding equipment is expensive.

To be suitable for use in a formaldehyde-urea molding composition a lubricant must also be colorless, and it must not become colored upon being exposed to light.

Zinc stearate is the only lubricant heretofore known that satisfies these requirements. However, zinc stearate is detrimental to formaldehyde-urea molding compositions in that it tends to render the finished articles opaque. The use of zinc stearate limits the degree of translucency that can be attained when lighting diffusers are molded from formaldehyde-urear compositions. In many cases zinc stearate impairs the beauty of articles molded from formaldehyde-urea resins by dulling their color or by rendering them opaque instead of brilliant and translucent. However, zinc stearate has been the most satisfactory lubricant heretofore available, and it has been in general use for a number of years in the manufacture of formaldehyde-urea molding compositions.

The principal object of the invention is the preparation of formaldehyde-urea molding compositions which contain an adequate amount of a permanently colorless, neutral lubricant in a dispersed condition that does not impair the translucency of articles molded from the composition. More specific objects and advantages are apparent from the description, which merely discloses and illustrates the invention and is not intended to impose limitations upon the claims.

A molding composition embodying the invention contains cadmium stearate or cadmium palmitate as a lubricant. The invention is based upon the discovery of something that has not heretofore been known to exist—a perfect lubricant. There was no reason to suppose that cadmium stearate or palmitate would possess each quality that is lacking in the lubricants heretofore known, and the discovery upon which the present invention is based was made simply by preparing some cadmium stearate and cadmium palmitate, and examining articles molded from formaldehyde-urea molding compositions in which the cadmium stearate and palmitate were incorporated as lubricants. The molded articles were found to be remarkably translucent compared with articles molded heretofore from formaldehyde-urea compositions. Enough cadmium stearate or palmitate may be used in a formaldehyde-urea molding composition so that the finished composition contains about 1 per cent (i. e., from ½ to 1½ per cent) stearate or palmitate. The incorporation of 1 per cent of cadmium stearate or palmitate in a formaldehyde-urea molding composition does not reduce the translucency of the finished article. In contrast, the use of ½ per cent of zinc stearate causes definite opacification of the molded article, and a molding composition containing 1 per cent of zinc stearate produces articles that are so opaque that the composition is entirely unsuitable for some uses.

Cadmium stearate or palmitate when obtained by precipitating it from a solution and drying the precipitate is a fluffy powder that shows no signs of gumminess. This powder can easily be dispersed into a molding composition by grinding in a ball mill.

The melting points of cadmium stearate and palmitate are low enough so that they melt at molding temperatures to form an oily liquid that lubricates the mold. These substances are neutral, so that they neither promote the deterioration of a formaldehyde-urea molding composition in storage nor retard the hardening of the composition in the mold. They are also colorless, and they do not become colored either by the action of light or by reaction with ingredients ordinarily employed in formaldehyde-urea molding compositions.

Cadmium stearate or palmitate can be prepared by mixing a solution of a soap of stearic or palmitic acid with a solution of a cadmium salt. The base that is combined with the stearic or palmitic acid to form the soap and the acid radical in the cadmium salt should be such that a soluble, substantially neutral salt remains in the solution after the precipitation of the insoluble cadmium soap. Thus a sodium or potassium soap may be used with cadmium sulfate, cadmium chloride or cadmium nitrate.

Before being mixed with the soap solution the solution of the cadmium salt should be sufficiently neutralized by means of a suitable base, such as sodium hydroxide, so that stearic or palmitic acid does not precipitate along with the cadmium soap. If the acid is allowed to precipitate along with the insoluble soap, the precipitate is gummy, so that it cannot be satisfactorily dispersed in a molding composition. The solution of the cadmium salt should be brought substantially to neutrality, as to a pH of 6 or 6.5, to produce a lubricant of proper acidity for incorporation in a formaldehyde-urea molding composition.

Various embodiments of the invention may be devised to meet various requirements.

Having described my invention, I claim:

1. A formaldehyde-urea molding composition comprising a lubricant selected from the group consisting of cadmium stearate and cadmium palmitate.

2. A formaldehyde-urea molding composition comprising about one per cent of a lubricant selected from the group consisting of cadmium stearate and cadmium palmitate.

3. A method of preparing a formaldehyde-urea composition for molding that comprises grinding therewith a lubricant selected from the group consisting of cadmium stearate and cadmium palmitate.

MAURICE H. BIGELOW.